United States Patent [19]
Chou

[11] Patent Number: 6,017,140
[45] Date of Patent: Jan. 25, 2000

[54] MULTIFUNCTIONAL BICYCLE LAMP

[76] Inventor: Ming-Fu Chou, No. 451-1, Pei Tun Rd., Taichung, Taiwan

[21] Appl. No.: 08/972,361

[22] Filed: Nov. 18, 1997

[51] Int. Cl.[7] .......................................................... B62J 6/02
[52] U.S. Cl. .......................... 362/475; 362/473; 362/800; 362/251; 362/544
[58] Field of Search .................................... 362/800, 473, 362/474, 475, 251, 184, 466, 542, 544, 545, 231

[56] References Cited

U.S. PATENT DOCUMENTS

| | | | |
|---|---|---|---|
| 4,711,107 | 12/1987 | Drane | 362/233 |
| 5,690,410 | 11/1997 | Lin | 362/72 |

*Primary Examiner*—Sandra O'Shea
*Assistant Examiner*—Marshall Honeyman
*Attorney, Agent, or Firm*—Bacon & Thomas

[57] ABSTRACT

A multifunctional bicycle lamp includes a press-button switch installed on a bicycle lamp body the switch being in connection with a control circuit in the bicycle lamp body. The control circuit primarily includes a microprocessor which is respectively in connection with a lamp bulb and a plurality of light emitting diodes. By controlling the press-button switch, the lamp bulb produces an illumination effect of a high-beam light or a low-beam light, and the light emitting diodes serve as hazard lights or power indication lights for a multifunction purpose through the microprocessor.

5 Claims, 4 Drawing Sheets

MULTIFUNCTIONAL BICYCLE LAMP

BACKGROUND OF THE INVENTION

1. The Field of the Invention

The present invention relates to a bicycle lamp, and more particularly to a multifunctional bicycle lamp which can be switched to various function modes for different purposes.

2. Description of the Related Art

To generally increase safety when riding a bicycle at night, in addition to adhering reflected stickers, a bicycle is usually equipped with a bicycle lamp for providing illumination. A conventional bicycle lamp is primarily composed of a lamp casing, a lamp base, a positioning seat and a lens, in which a lamp bulb is installed in the lamp shield and a horizontally operated control switch is installed at one end of the lamp base to activate the lamp bulb for providing illumination required for riding a bike in the night.

However, the conventional bicycle lamp is very simple, that is, it does not have any functions other than illumination, for example, as a hazard light or indication of the battery power of the bicycle lamp. Therefore, the conventional bicycle lamp has shortcomings which need to be overcome.

SUMMARY OF THE INVENTION

The present invention is directed to a multifunctional bicycle lamp.

An objective of the present invention is to provide a multifunctional bicycle lamp which can be changed to different function modes for various purposes.

In accordance with one aspect of the invention, there is provided a multifunctional bicycle lamp, which simultaneously activates a lamp bulb, a hazard light and a power indication light by a control circuit with a press-button switch so that the bicycle lamp can provide illumination and other functions at the same time.

In accordance with another aspect of the invention, there is provided a multifunctional bicycle lamp, in which the press-button switch is installed on a bicycle lamp body and is in connection with the control circuit in the bicycle lamp body. The control circuit is mainly composed of a microprocessor which is respectively in connection with the lamp bulb and a plurality of light emitting diodes. By using the press-button switch to generate various control signals, the microprocessor activates the lamp bulb to produce an illumination performance of a high-beam light or a low-beam light, and the light emitting diodes serve as hazard lights or power indication lights.

BRIEF DESCRIPTION OF THE DRAWINGS

The above objective, other features and advantages of the present invention will become more apparent by describing in detail the preferred embodiment thereof with reference to the attached drawings, in which.

DETAILED DESCRIPTION OF THE PREFERRED EMBODIMENT

Figure 1:
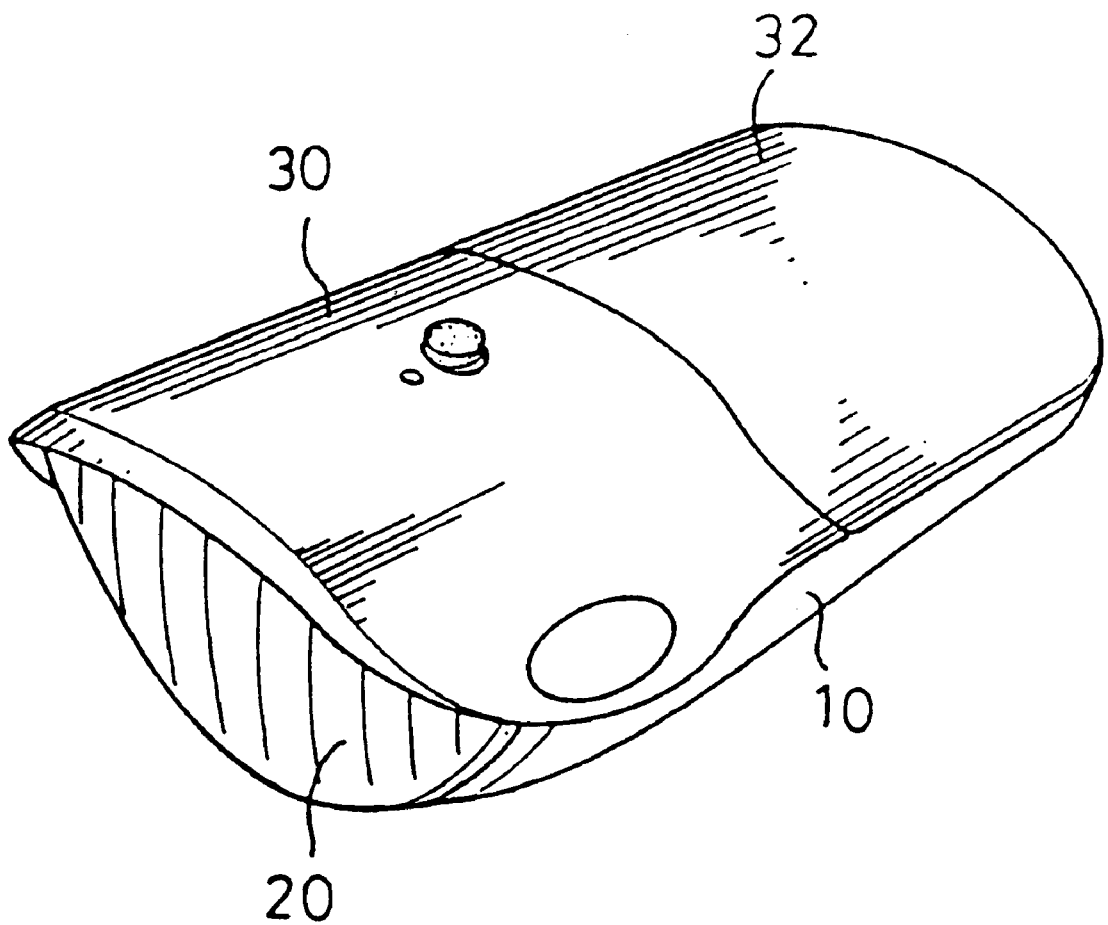
FIG. 1 shows a perspective view of a multifunctional bicycle lamp in accordance with the present invention.
Figure 2:
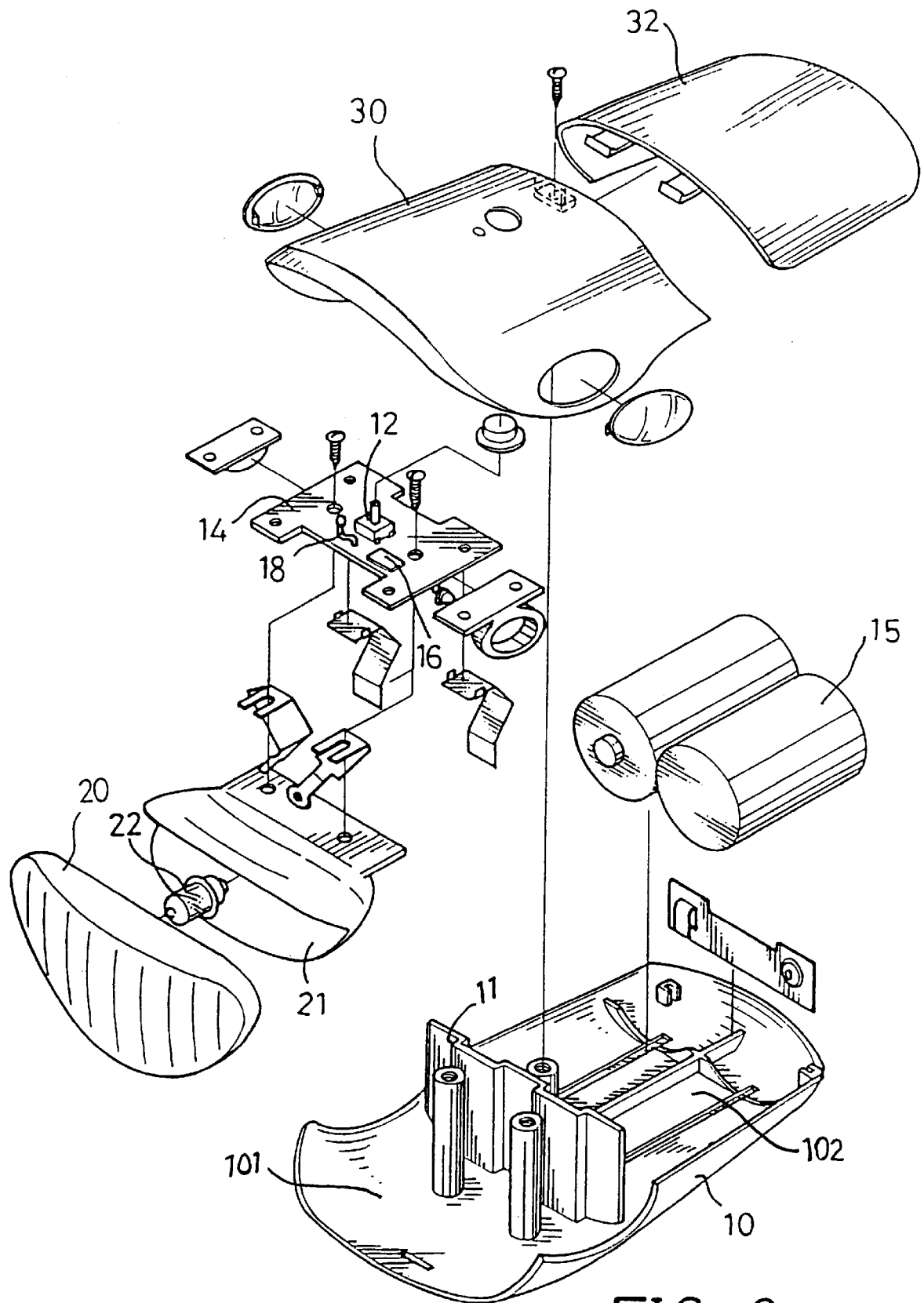
FIG. 2 shows an exploded view of the multifunctional bicycle lamp in accordance with the present invention.

Referring to FIGS. 1 and 2, a bicycle lamp body includes a lamp base 10, a lens 20 shielding a lamp bulb 22 and a lamp casing 30. A battery cover 32 is installed on one side of the lamp casing 30 for sealing a battery compartment 102 in the lamp base 10.

After the lamp base 10 and the lamp casing 30 are mutually engaged with each other, a hollow housing is formed therein. The lamp base 10 is divided into a front space and a rear space by a partition 11. The front space defines a chamber 101 for accommodating a lamp reflector 21 and a circuit board 14. The rear space defines the battery compartment 102 for receiving two dry batteries 15. The battery cover 32 is correspondingly positioned above the battery compartment 102 and mutually engaged with the lamp casing 30.

Furthermore, the lens 20 is retained at one end of the lamp base 10 and the lamp casing 30, and located at a front of the chamber 101.

A plurality of conductor strips 13 are disposed on the circuit board 14 for providing contacts with the dry batteries 15 so that power can be supplied through the dry batteries. A press-button switch 12 and a control circuit are also located on the circuit board 14. The press-button switch 12 penetrates the casing 30 so that a user may manipulate the control circuit on the circuit board 14 externally from outside the bicycle lamp body.

Figure 3:
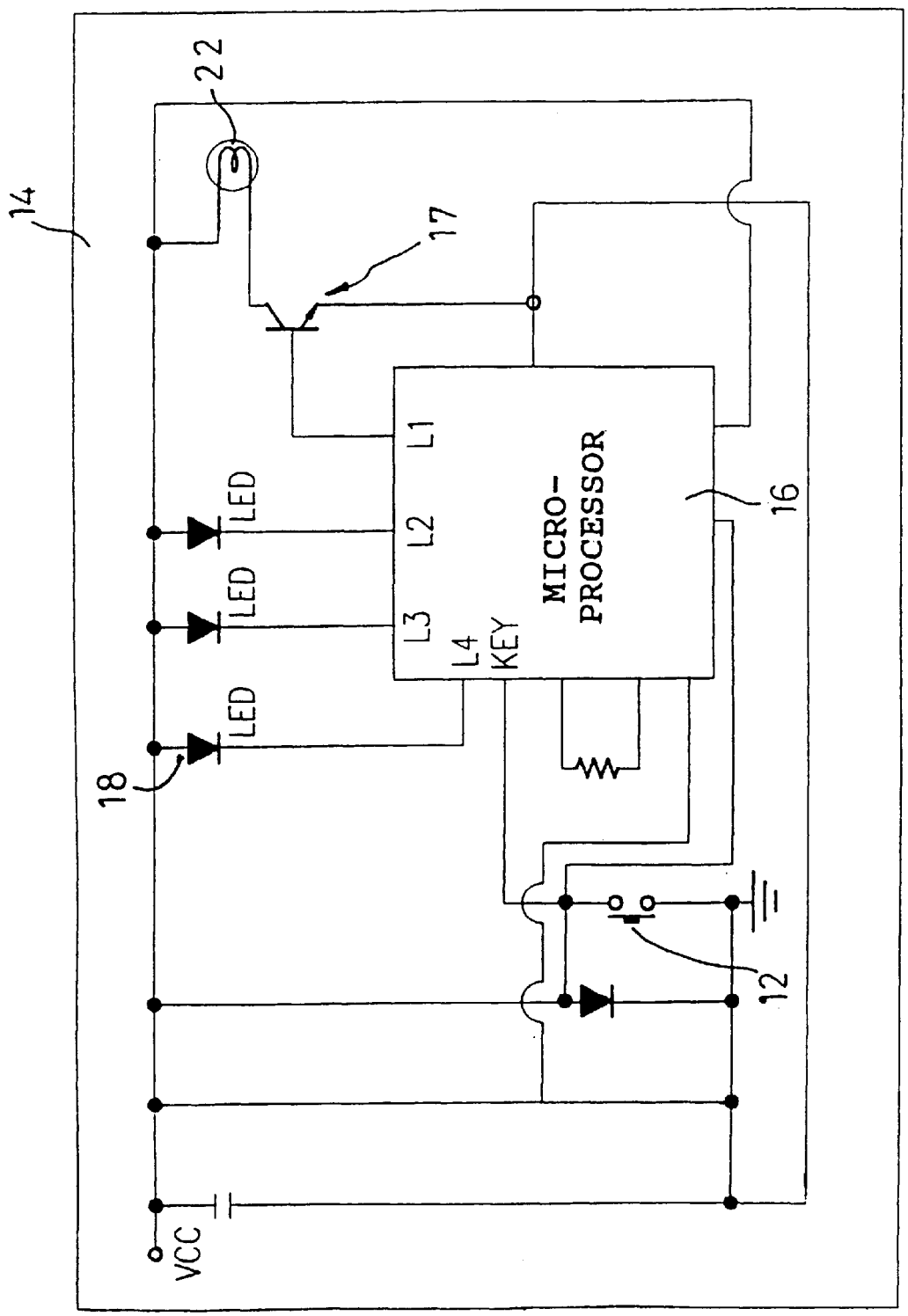
FIG. 3 shows a detailed layout of a control circuit of the multifunctional bicycle lamp in accordance with the present invention.

As shown in FIG. 3, the control circuit on the circuit board 14 primarily includes a microprocessor 16 acting as a control center to be respectively in connection with the lamp bulb 22, the press-button switch 12 and other devices.

In the control circuit, the microprocessor 16 connects to the press-button switch 12 through a signal input pin KEY thereof. In accordance with the number of times the press-button switch 12 is pressed, various control signals are generated by the microprocessor 16 for respectively specifying different control purposes in order to manage operations of all peripheral devices coupled to the microprocessor 16.

The lamp bulb 22 which provides an illumination function for the bicycle lamp is in connection with an output pin L1 of the microprocessor 16 through a transistor 17, in which the microprocessor 16 itself outputs a full-wave or half-wave driving signal through a switching control of the press-button switch 12 and the lamp bulb 22 is activated after the full-wave or half-wave driving signal is amplified by the transistor 17. When the microprocessor 16 outputs a full-wave driving signal, the bulb 22 emits a strong light for serving as a high-beam light of the bicycle lamp, Alternatively, the bulb 22 emits a weak light for serving as a low-beam light when the microprocessor 16 outputs a half-wave driving signal.

Each of a plurality of output pins L2, L3 and L4 of the microprocessor 16 is respectively in connection with one of three light emitting diodes (LEDs) 18. Each LED 18 may serve as either a hazard light for signalling a position or an indication of a power condition of the dry batteries 15 in which the LEDs 18 connected with the output pins L2 and L3 serve as hazard lights, in which the former is used as a flashing hazard light and the latter as a steady hazard light.

Another LED 18 connected with the output pin L4 of the microprocessor 16 is used for power testing. When the voltage of the dry batteries 15 is in a normal condition, that is, the dry batteries 15 are of a regular power capacity, the LED 18 connected with the output pin L4 emits a green light, but this LED 18 emits a red light when the power of the dry batteries 15 is insufficient. Accordingly, a user can tell the power status of the dry batteries 15 from the color of the light that the LED 18 connected with the output pin L4 emits. If the dry batteries 15 used in the bicycle lamp are replaced by chargeable batteries, the LED 18 connected with the output pin L4 is made of a three-color LED and emits another color of light to indicate the batteries are in a charging state.

Figure 4:
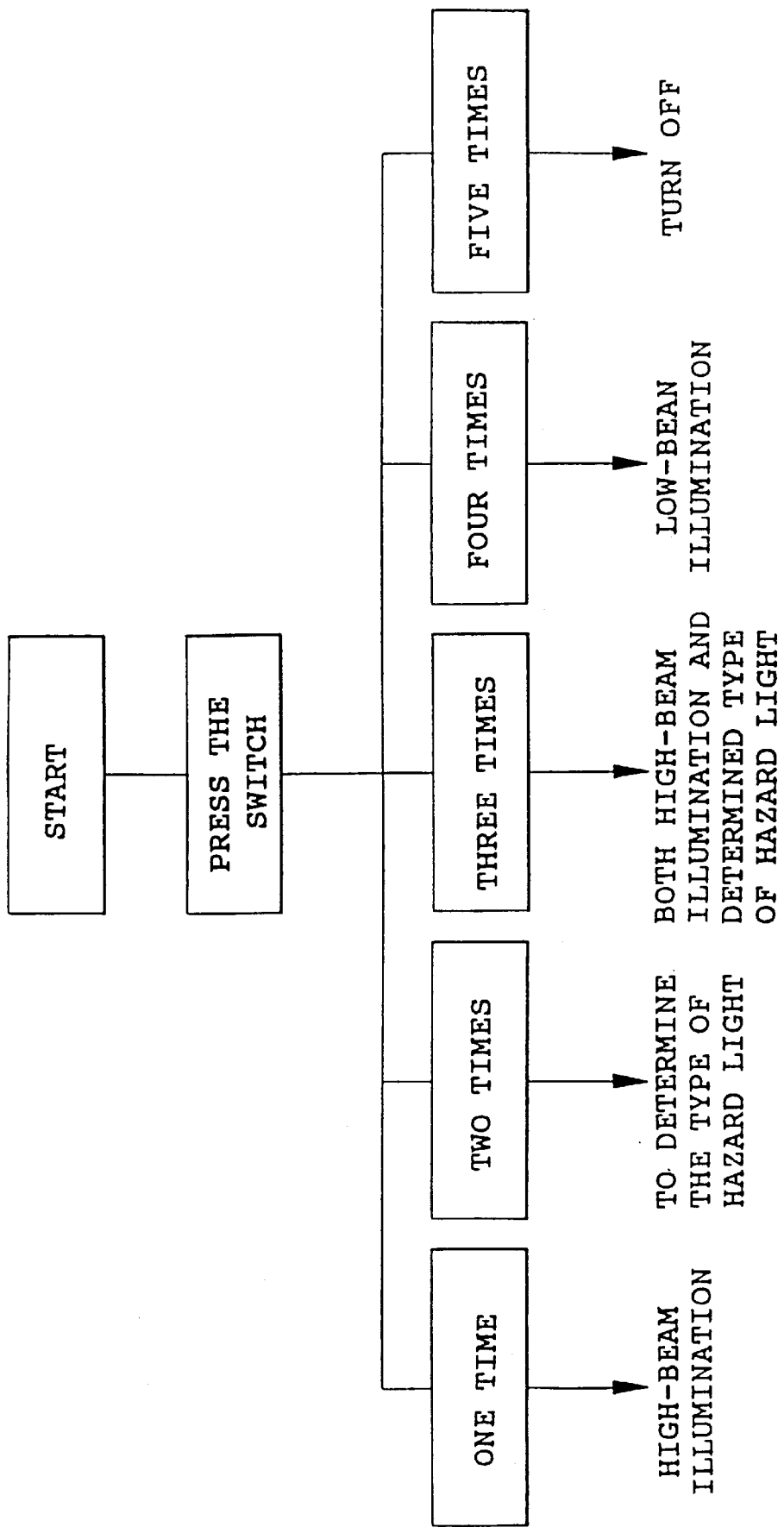
FIG. 4 shows an operation flow chart of the control circuit of the multifunctional bicycle lamp in accordance with the present invention.

An operation method of the control circuit is shown as follows with reference to FIG. 4.

A signal will be generated and sent to the microprocessor 16 when a user presses the switch 12 once, and a full-wave control signal generated by the microprocessor 16 activates the lamp bulb 22 to emit a strong light having an illumination performance of a high-beam light.

When the user presses the switch 12 twice, the LEDs 18 connected with the output pins L2 and L3 serving as hazard lights are selected to be of a flashing type or a steady type as required by the user.

When the user presses the switch 12 three times, the microprocessor 16 generates a full-wave signal to activate the lamp bulb 22 to emit a high-beam light and the LEDs 18 previously described are turned on simultaneously for serving as the selected hazard lights.

The microprocessor 16 generates a half-wave signal if the user presses the switch 12 four times, and the brightness of the lamp bulb 22 becomes of lower intensity and the light that the lamp bulb 22 emits changes to a low-beam light.

When the user presses the switch 12 five times, the lamp bulb 22 and the LEDs 18 described above are both turned off.

Accordingly, the aforementioned switching control of the press-button switch 12 is always applied each time the bicycle lamp is used. The intensity of the light generated by the lamp bulb 22 is controlled by an output signal of the microprocessor 16 which is controlled by pressing the switch 12 at different times and the LEDs 18 respectively serve as hazard lights or power indication lights.

Furthermore, the microprocessor 16 has various function designs to control the brightness and the ON/OFF statuses of the lamp bulb 22 and all LEDs 18 depend on different requirements so that the bicycle lamp matches the different requirements to extend the application scope of the bicycle lamp.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A multifunctional lamp, comprising:

a bicycle lamp body;

a lamp bulb installed on the bicycle lamp body;

a press-button switch protruding out of the bicycle lamp body;

a control circuit installed in the bicycle lamp body; and at least three light emitting diodes, wherein the control circuit is composed of a microprocessor, an input pin of the microprocessor is in connection with the press-button switch, an output pin of the microprocessor is in connection via a transistor with the lamp bulb, said three light emitting diodes are respectively coupled to three output pins of the microprocessor, one of the three light emitting diodes being arranged to be used for power testing and the other two of the three light emitting diodes being arranged to be used as hazard lights, and the brightness of the lamp bulb and selection of the hazard lights are controlled by the press-button switch.

2. The multifunctional lamp as claimed in claim 1, wherein the bicycle lamp body comprises a lamp base, a lamp casing mutually engaged with the lamp base, a lens retained at one end of the lamp base and the lamp casing and shielding the lamp bulb, and a battery cover.

3. The multifunctional lamp as claimed in claim 2, wherein the lamp base defines a chamber for accommodating a lamp reflector and a circuit board, and a battery compartment for receiving the batteries, and the battery cover is correspondingly positioned above the battery compartment and mutually engaged with the lamp casing.

4. The multifunctional lamp as claimed in claim 1, wherein one of the two hazard lights is of a steady type and the other hazard light is of a flashing type.

5. The multifunctional lamp as claimed in claim 1, wherein the light emitting diode used for power testing is composed of a three-color light emitting diode.

* * * * *